Feb. 22, 1955  H. C. FORD ET AL  2,702,667
COMPUTING APPARATUS

Filed Aug. 7, 1936  4 Sheets-Sheet 1

INVENTORS
Hannibal C. Ford
Raymond E. Crooke
William H. Newell
BY
THEIR ATTORNEY Feb. 22, 1955　　　H. C. FORD ET AL　　　2,702,667
COMPUTING APPARATUS Filed Aug. 7, 1936　　　　　　　　　　　　　　　　　　4 Sheets-Sheet 2

$J_h = J_a \cos A + J_r \sin A$
$J_{r_H} = J_r \cos A - J_a \sin A$

N-S CHANGE = $J_{r_H} \cos B - J_b \sin B$
E-W CHANGE = $J_{r_H} \sin B + J_b \cos B$ INVENTORS
Hannibal C. Ford
Raymond E. Crooke
William H. Newell
BY
THEIR ATTORNEY

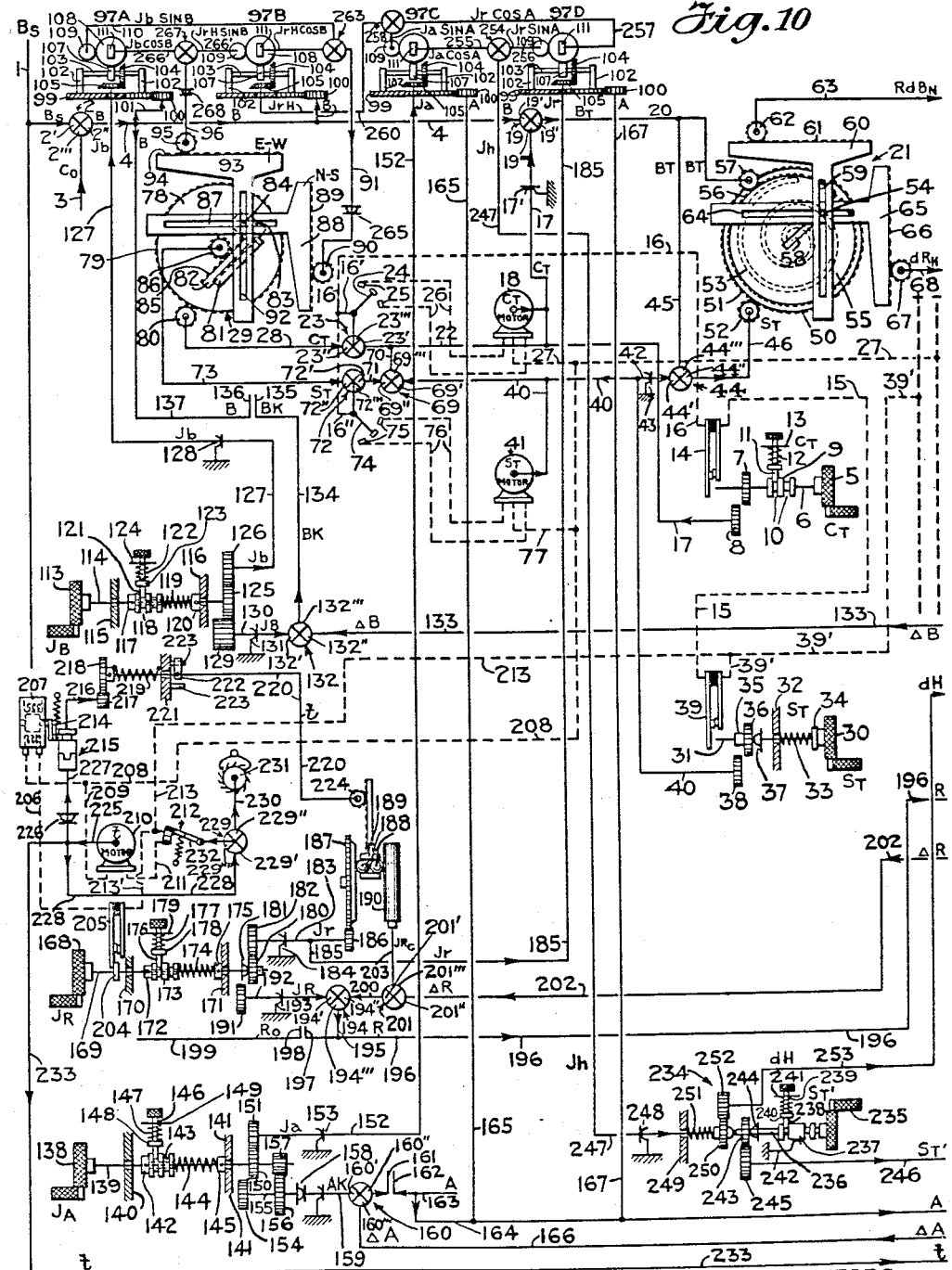

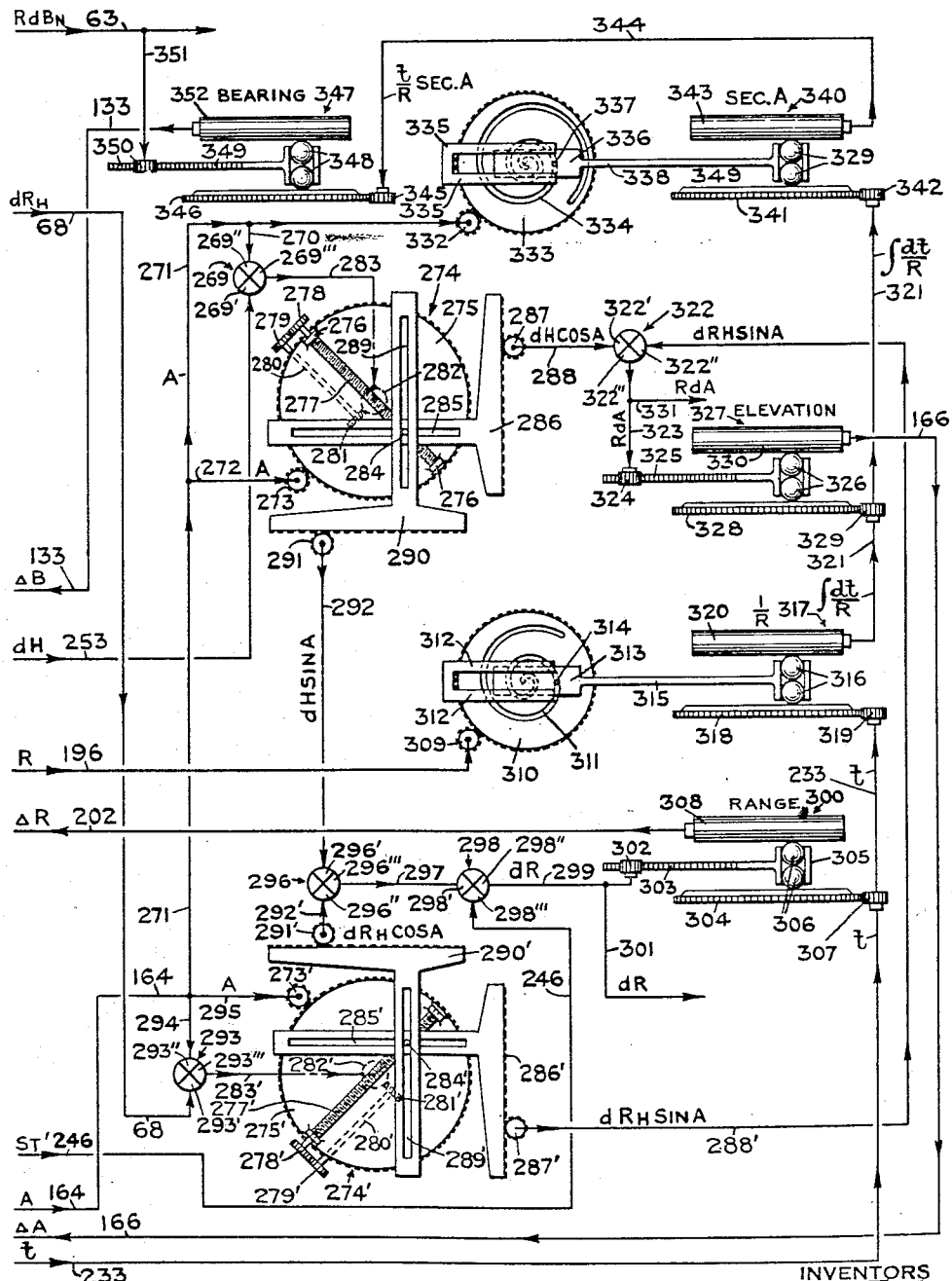

United States Patent Office 2,702,667
Patented Feb. 22, 1955

2,702,667

COMPUTING APPARATUS

Hannibal C. Ford, Great Neck, Raymond E. Crooke, Little Neck, and William H. Newell, New York, N. Y., assignors to The Sperry Corporation, a corporation of Delaware Application August 7, 1936, Serial No. 94,754

24 Claims. (Cl. 235—61.5)

This invention relates to apparatus for controlling the firing of ordnance and more particularly to that class of instruments known as range keepers. In general, instruments of this character have for an object the continual generation of values of bearing and range for a target, and, in the case of an aerial target, its elevation, to furnish information from which the predicted position of a target may be determined as well as its position during intervals between observations or when the target is temporarily obscured.

This general object is attained by so constructing the range keeper that when the bearing, range and elevation are correctly generated by it they will agree with observed values of these quantities as obtained by a director in the case of bearing and elevation and by a range finder in the case of range. The usual primary factors from which the generated values are computed are course and speed of the own ship, the direction and velocity of the wind and the true course, speed and rate of climb of the target.

Instantaneously varying quantities which also enter into the computation of the rates are range, angle of elevation above the horizon in the case of an aerial target, and the relative bearing of the target. These quantities are initially introduced into the instrument in accordance with the observed values thereof. Any deviations which subsequently occur between the generated and observed values of bearing, elevation and range are due to errors in the primary factors, especially those in the course, speed and rate of climb of the target the values of which, from the nature of the problem, can only be estimated, as distinguished from the course and speed of the own ship, for instance, which are capable of exact determination by suitable instruments on the ship itself.

It is a general object of the invention to provide an instrument by which errors in the estimated course and speed and rate of climb of a target may be detected and corrected to the end that accurate values of these factors may be determined for use in connection with suitable predicting mechanism, since the future position of a target at the end of the time of flight of a projectile depends upon these factors. The values of these factors are also needed as a basis for continually generating in the range keeper the values of bearing and range and in the case of an aerial target its elevation.

The particular nature of the invention, as well as other objects and advantages thereof, will appear most clearly from a description of a preferred embodiment thereof as shown in the accompanying drawings in which:

Fig. 10 is a schematic representation of a portion of the apparatus;

Fig. 11 is a representation similar to Fig. 10 of the remainder of the apparatus; and Figs. 12 and 13 are detail views relating to the input cranks of the apparatus.

Figure 1:
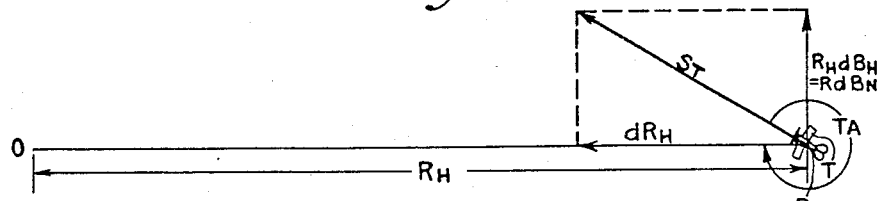
Figs. 1, 2, 3 and 4 are a series of related diagrams to be used in connection with an explanation of one of the problems involved herein.

One of the problems presented by this case will appear most clearly from an explanation of Figs. 1, 2, 3 and 4 in all of which O represents the observing station on land or on shipboard, as the case may be, and T represents an aerial target, such as an airplane. Fig. 1 is a plan view representing the problem as viewed from a distant point above the surface of the earth, in which case the problem will appear as projected on the surface of the earth since all vertical components will not appear as such. The target T will therefore appear to be located at a point D on the surface of the earth. The line O—D will therefore represent the projection on the earth of the line of sight between the observing station and the target, so that its length $R_H$ represents the horizontal range of the target from the station.

$S_T$ is defined as a vector representing in direction the course of the target and in magnitude the speed of the target as seen from the distant point. In other words $S_T$ is the speed of the target in the horizontal plane. The vector $S_T$ is shown as having been resolved into two rectangular components, one, $dR_H$, along the horizontal projection of the line of sight and representing the rate of change of the horizontal range $R_H$. The other component, $R_H dB_H$, which is at right angles to the projection O—D of the line of sight, represents the linear rate of change of movement across the line of sight and will be hereinafter referred to as the linear deflection component. The angle designated $T_A$, between the vector $S_T$ and the projected line of sight O—D is known as the target angle.

Figure 2:
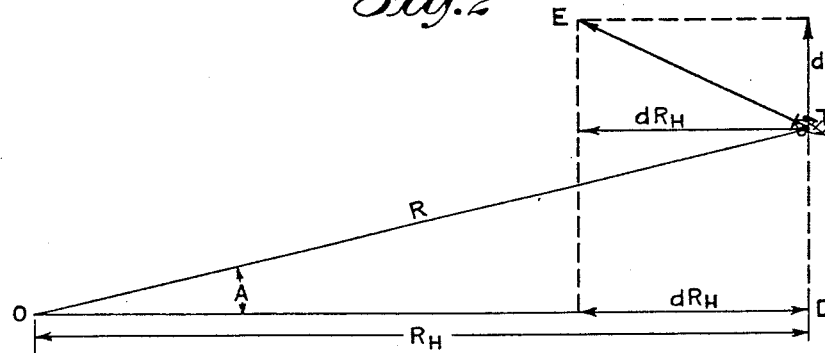

Fig. 2 is an elevation view representing the problem as viewed from a distant point at right angles to the horizontal projection of the line of sight and showing the target T located at an angle of elevation A above the surface of the earth. The line O—T in this case represents the actual or slant range R of the target, while the line O—D represents the horizontal range $R_H$, that is, the range represented by the line O—D of Fig. 1. The vector $S_T$ of Fig. 1 which represents the course and speed of the target as viewed from a point above the surface of the earth will appear in Fig. 2 as a vector E—T. This vector is resolved into two rectangular components, one $dR_H$, being the same as in Fig. 1 and representing the rate of change of the horizontal range and the other, $dH$, representing the rate of change in height H, or the rate of climb as it is sometimes called, due to a vertical component of the movement of the target, which, since it is an aerial one, may have such a component. The length of the vector E—T will accordingly be expressed by $$\sqrt{(dR_H)^2+(dH)^2}$$

Figure 3:
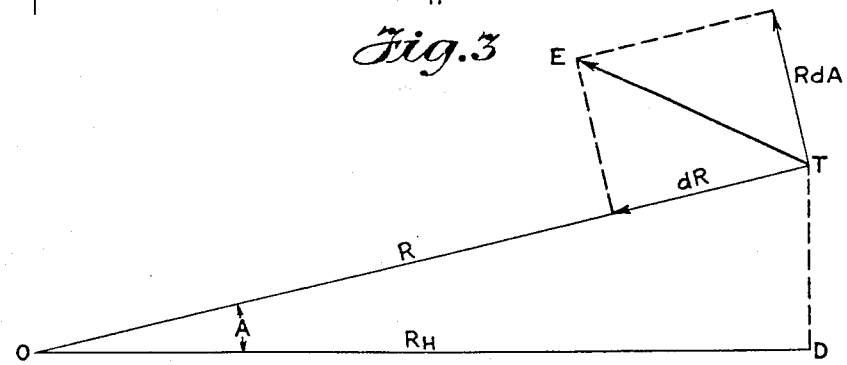

Since the range R is measured along the line of sight O—T and elevation is measured at right angles to this line and in a vertical plane, it is necessary, as appears in Fig. 3, in order to obtain a basis of comparison of the rates of change of these factors, to resolve the vector E—T into two rectangular components, one, $dR$, along the line O—T and representing the rate of change of range R, and the other, $RdA$, representing in linear measure the rate of change of movement of the target perpendicular to the line of sight and in a vertical plane containing the line O—T.

Figure 4:
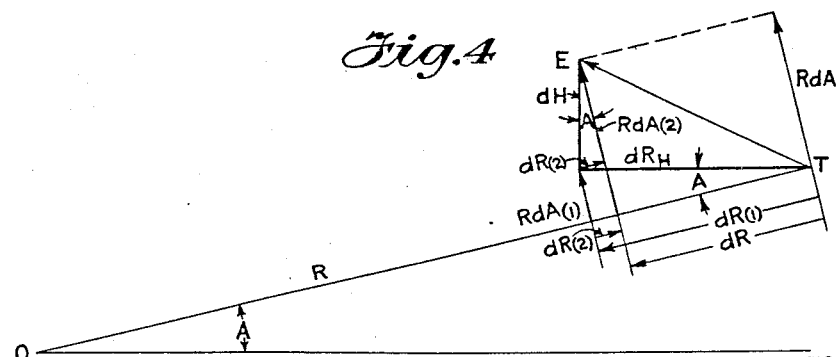

Fig. 4 shows the manner in which the components of Fig. 3 may be obtained from the components of Fig. 2. The component $dR_H$ of Fig. 2 is resolved into a component $dR(1)$ along the line O—T and a component $RdA(1)$ at right angles thereto, both of these resulting components being in linear measure. The component $dH$ of Fig. 2 is resolved into a component $dR(2)$ parallel to the line O—T and a component $RdA(2)$ at right angles thereto. It is evident that $dR$ is the sum of the components $dR(1)$ and $dR(2)$.

It is to be noted that in the illustrative diagrams, Figs. 1 to 4 inclusive, the direction of the vector ET is such that the range is decreasing and consequently the rates of change of range, both horizontal and slant, are negative. That is $dR_H$ as shown is negative and $dR$ and $dR(1)$ are negative. Also the component $dR(2)$ is in a direction to increase the range and is therefor positive. It is, however, apparent that the signs of these quantities depend upon the direction of the vector ET.

Component $dR(1)$ is equal to $dR_H \cos A$ and component $dR(2)$ is equal to $dH \sin A$, so that (1) $\qquad dR = dR_H \cos A + dH \sin A.$ Component $RdA(1)$ is equal to $dR_H \sin A$ and component $RdA(2)$ is equal to $dH \cos A$, so that (2) $\qquad RdA = dR_H \sin A + dH \cos A$ It has been explained above that the components $dR_H$, $RdA$ and $R_H dB_H$ of the course and speed of the target are rates of change expressed in linear measure of the quantities which they represent. Since bearing and elevation, which are two of the quantities used to determine the position of the target, are measured in units of angular measure, it is necessary to convert the linear components $RdA$ and $R_H dB_H$ into quantities representing such rates of change of angular movement in order that the bearing and elevation generated by the apparatus may be compared with the measured bearing and elevation to accomplish the purpose of the invention.

In as far as the component $RdA$ is concerned, it is multiplied by the reciprocal of range, that is $$\frac{1}{R}$$

which gives (3) $\qquad RdA \times \frac{1}{R} = dA$ which is the angular elevation rate. If $dA$ be integrated over time, $t$, changes of elevation $\Delta A$ will be obtained which may be compared with the observed elevation in order to furnish a basis for changing the estimated course and speed of the target until the values of elevation generated in the apparatus agree with the measured values of this same quantity, as will hereinafter be explained in detail.

It has been explained in connection with Fig. 1, that $R_H dB_H$ is a linear component of the vector $S_T$ at right angles to the line O—D and referred to a horizontal plane. This component is equal to a linear component represented by $RdB_N$ in which R is the actual range and $dB_N$ is the rate of change of angular deflection in the inclined plane which contains the line of sight.

From Fig. 2

$$\cos A = \frac{R_H}{R} \text{ or } R_H = R \cos A$$

$R_H dB_H$ may therefore be written $R \cos A dB_H$. Since $R_H dB_H = R dB_N$ it follows that (4) $\qquad RdB_N = R \times \cos A \times dB_H$ or (5) $\qquad dB_H = \frac{1}{R} \times \sec A \times RdB_N$ In the apparatus disclosed the horizontal course and speed of the target are resolved into a linear component $dR_H$ and another linear component $RdB_N$. This last named component is then converted into the angular componend $dB_H$ by multiplying it by $$\frac{1}{R}$$

and sec A in accordance with Equation 5. This gives the angular bearing rate $dB_H$ in the horizontal plane This rate when integrated over time, $t$, will give changes of bearing $\Delta B$ for comparison with the observed bearing.

Referring to Fig. 10, 1 is a shaft operable in accordance with relative target bearing, designated $B_S$, by a suitable instrument, such as a director. The shaft is connected to one side 2' of a differential 2 the center 2''' of which is connected to a shaft 3 operable in accordance with the true course of own ship, designated Co. The other side 2'' is therefore operable in accordance with the true bearing of the target, designated B, which by means of a shaft 4 is transmitted to other elements as will hereinafter appear. In further explanation of the relationship between the quantities mentioned above refrence is made to Patent No. 1,827,812, Hannibal C. Ford, for Range and Bearing Keeper and particularly to Fig. 13 and the explanation thereof.

A crank 5 is provided for introducing the estimated true course of the target, designated $C_T$, the crank being attached to one end of a shaft 6 mounted for longitudinal as well as rotary movement and carrying a gear 7 adapted to be moved into engagement with a gear 8 by inward longitudinal displacement of the shaft. A collar 9 having a pair of grooves 10 is attached to the shaft. A latch 11 is normally held in one of the grooves by a spring 12 between a shoulder on the latch and a fixed member 13.

A switch 14 has two blades of unequal length and normally in engagement except when the shaft 6 occupies its inward position in which its free end engages the longer blade and separates it from the shorter blade. A conductor 39' connects the shorter blade of a similar switch 39 to the positive or plus side of a source of direct current supply, the longer blade of switch 39 being connected by a conductor 15 to the shorter blade of the switch 14. The longer blade of switch 14 is connected by conductor 16 to a switch arm to be later described.

The gear 8 is carried on a shaft 17 to which is connected the armature of a reversible motor 18. The shaft 17 is provided with a friction device 17' for preventing unintentional displacement of the shaft. The shaft is connected to the center 19''' of a differential 19 to which it thus imparts movement in accordance with the quantity $C_T$. One side 19' of the differential is connected to the shaft 4 operable in accordance with the true bearing of the target, B, so that the movement of the other side 19'' represents the target angle, designated $B_T$, which by means of a shaft 20 connected thereto is imparted to an input element of a device 21, hereinafter referred to as "a component solver" which will presently be described in more detail.

Driven from the shaft 17 is a branch shaft 22 connected to one side 23' of a differential 23, the center 23''' of which carries the previously referred to switch arm 24, adapted to engage one or the other of a pair of fixed contacts 25 which are connected by conductors 26 to the reversely wound windings of the motor 18. A conductor 27 leads from the common terminal of these windings to the negative or minus side of the supply line. The conductor 16 leading from the switch 14 is connected by another conductor 16' to the arm 24 of the differential 23. The other side 23'' of the differential is connected to a shaft 28 which in turn is connected with one element of a device 29 to be hereinafter referred to as "a vector solver" and described in more detail. A type of differential gear for the above purpose is shown at 25 in Patent No. 1,842,160 to Hannibal C. Ford for Speed and Distance Indicator.

For the purpose of introducing the estimated horizontal speed of the target, designated $S_T$, there is provided a crank 30 attached to one end of a shaft 31 which passes through an aperture in a fixed member 32. A spring 33 surrounding a portion of the shaft engages the fixed member at one end and at the other end enters a cup-shaped member 34 attached to the shaft adjacent to the crank 30. The shaft also carries a collar 35 against which a gear 36 is normally held by means of a suitable friction device 37 attached to the shaft 31. The arrangement is such that the connection will yield if any excess load comes upon the moving parts of the device. A gear 38 is adapted to be engaged by the gear 36 upon appropriate longitudinal displacement of the shaft 31 against the force of the spring 33 which serves to restore the parts to their normal condition, as shown in Fig. 10, when the crank is subsequently released.

The previously referred to switch 39 is adapted to be controlled by longitudinal movement of shaft 31 to engage the longer blade and open the circuit which includes the conductor 39' leading from the positive or plus side of the current supply to the switch 39, the conductor 15 therefrom to switch 14, the conductor 16 from the latter and another conductor 16'' that goes to another switch arm of the apparatus to be hereinafter described.

A shaft 40 which carries the gear 38 is connected to the armature of a motor 41 and also has a branch shaft 42 with which a friction device 43 coacts. The shaft 42 is connected to a side 44' of a differential 44 the center 44''' of which is connected by a shaft 45 to the shaft 20. The other side 44'' is connected to a shaft 46 which serves as a second input element for the component solver 21.

The component solver 21 is shown in simplified form in view of the fact that devices of this nature are well known in the art to which this invention relates. In general it consists of a disc 50 having a peripheral gear 51 engaging a pinion 52 on the end of shaft 46 whereby the disc may be correspondingly turned. The disc is provided with a cam groove 53 designed to radially displace a pin 54 extending into the groove in accordance with the estimated speed of the target as represented by the movement imparted to the shaft 46 by manipulation of the crank 30.

Mounted concentrically with respect to the disc 50 is another disc 55 having a toothed periphery 56 engaged by a pinion 57 on the end of shaft 20 whereby the disc may be rotated in accordance with the estimated target angle as represented by the movement imparted to the shaft 20. The pin 54 is attached to a carriage (not shown) suitably mounted in a radial slot 58 in the disc 55. The pin 54 also extends through a slot 59 in an arm of a T-shaped slide 60 provided with a rack 61 engaging a pinion 62 on a shaft 63 leading to the apparatus shown in Fig. 11 as will hereinafter appear. The arrangement is such that the movement imparted to the slide 60 represents the component $RdB_N$ of Fig. 1.

The pin 54 also extends through a slot 64 in an arm of another T-shaped slide 65 disposed for movement perpendicularly with respect to the slide 60 and provided with a rack 66 engaging a pinion 67 on a shaft 68 leading to Fig. 11. In this case the movement imparted to the slide 65 represents the component $dR_H$ of Figs. 1 and 2.

As previously explained the shafts 40 and 42 are operated in accordance with the estimated horizontal speed of the target. Assuming the shafts 20 and 45 to be stationary so that the center 44''' of differential 44 is fixed, the rotation of shafts 40 and 42 will correspondingly turn the side 44' of differential 44 which will in turn rotate the side 44'' of the differential and the shaft 46 connected thereto as well as the pinion 52 and the disc 50 to position the pin 54 radially of the disc in accordance with the estimated horizontal speed of the target.

If, on the other hand, the shafts 40 and 42 be assumed stationary, while the shafts 20 and 45 are rotated in accordance with the estimated target angle, the side 44' of differential 44 will be fixed and the shaft 20 and pinion 57 will turn the disc 55 to alter the angular position of the slot 53 in accordance with the estimated target angle. At the same time the center 44''' of the differential 44 which is attached to shaft 45 will drive the side 44'', the shaft 46 connected thereto and the pinion 52 to turn the disc 50 in unison with the disc 55 to maintain the pin 54 in the speed position to which it has been set by operation of shaft 40. Under all conditions of operation the displacement of pin 54 will in turn displace the slides 60 and 65 in accordance with the components of the course and speed of the target which they represent, namely $RdB_N$ and $dR_H$ respectively.

The shaft 40 is connected to a side 69' of a differential 69, the center 69''' of which is connected by a shaft 70 to the shaft 22. The other side 69'' is connected by a shaft 71 to a side 72' of a differential 72 which is like the differential 23 in structure and function. The other side 72'' is connected by a shaft 73 to a part of the vector solver 29. The center 72''' carries a switch arm 74 coacting with a pair of fixed contacts 75 connected by conductors 76 to the reversely wound windings of motor 41. A conductor 77 connects the common point of the windings to the conductor 27 leading to the minus side of the source of supply. The conductor 15 leading from the switch 39 is connected through switch 14 and conductors 16 and 16'' to the previously mentioned switch arm 74 of the differential 72.

The vector solver 29 is shown herein in simplified form in the manner of the component solver 21 which it resembles to the extent that by means of input shafts and gears a pin may be positioned in direction and magnitude in accordance with a vectorial representation of a quantity, and will displace output slides in accordance with certain components of the vector represented by the position of the pin. The vector solver, however, differs from the component solver in being reversible so that under certain conditions the slides become input elements and may be set in accordance with components to position the pin in accordance with the vector corresponding to such components. The parts which in the component solver are associated with the pin to position it, then become the output elements of the vector solver.

The vector solver includes a disc 78 having a peripheral gear 79 engaged by a pinion 80 on the shaft 28, whereby the disc may be turned in accordance with the estimated true course of the target by suitable manipulation of the crank 5. The disc 78 carries a guide 81 within which is a movable carriage 82 having at one end an offset portion 83 carrying a pin 84. The carriage is provided with a rack 85 engaged by a pinion 86 on the end of shaft 73 whereby manipulation of crank 30 will position the pin 84 radially of disc 78 in accordance with estimated horizontal speed of the target.

The pin 84 extends through a slot 87 in an arm of a T-shaped slide 88 provided with a rack 89 engaging a pinion 90 on the end of a shaft 91 extending to other elements of the instrument as will hereinafter appear.

The pin 84 also extends through a slot 92 in an arm of a second T-shaped slide 93 which is arranged to move perpendicularly to the slide 88. The slide 93 is provided with a rack 94 engaging a pinion 95 on the end of a shaft 96 leading to other elements of the instrument.

The slide 88 is arranged to move parallel to an arbitrary line in the device representing a geographical datum, such as the meridian, while the slide 93 is arranged to move perpendicularly to the datum line. In other words, the movement of slide 88 represents a North-South component of the estimated true course and speed of the target while the movement of slide 93 represents the East-West component thereof.

The differential 69 performs the same function with respect to the vector solver 29 as does the differential 44 with respect to the component solver 21. That is, the estimated speed of the target or the estimated true course of the target may be set up separately by successive manipulations of the crank 30 or 5 respectively, or these quantities may be simultaneously set up in the device by joint operation of the cranks. In such manipulations, thrusting the target speed crank 30 to the left in Fig. 10 to mesh gears 36 and 38 axially shifts shaft 31 to push the longer blade of switch 39 out of engagement with the shorter blade thereof, thus opening the circuits of both motors 18 and 41 between conductors 39' and 15. Similarly, with latch 11 retracted, when the target course crank 5 is thrust to the left, the crank shaft 6 separates the longer blade of switch 14 from its shorter blade, thereby also opening the circuits of both motors 18 and 41. Hence, when either or both of the cranks 30 and 5 are so actuated, the motors 18 and 41 are de-energized.

Turning the cranks 30 and 5 under these conditions, results in a displacement of the center 72''' of differential 72 so that the switch arm 74 engages one of the fixed contacts 75, and in the displacement of the center 23''' of differential 23, which causes the switch arm 24 to engage one of the fixed contacts 25. But, neither the motor 41 nor 18 is energized because the switches 39 and 14 are connected in series and are in circuit with both motors 18 and 41, and one, or both, of these switches is now open. Since the engagement of switch arms 74 and 24 with a fixed contact holds the differential centers 72''' and 23''' stationary, the drive from crank 30 is continued by differential side 72'' and shaft 73 to pinion 86, which thus shifts carriage 82 according to the estimated target's speed while differential side 23'', shaft 28 and pinion 80 turn disc 78 in correspondence to the estimated target's course. Thus, the pin 84 is displaced by the manual operations to set the North-South and East-West component slides 88 and 93, respectively. Upon completion of the manual introductions of the estimated target's speed and/or course, the cranks 30 and 5 are returned to the positions shown in Fig. 10 whereupon the switches 39 and 14 automatically close. As the switch arms 74 and 24 have respectively remained in engagement with one of the contacts 75 and 25, the motors 41 and 18 run to return these switch arms to their neutral positions, stopping the operation of the motors.

Whether the vector solver 29 is operated manually or by the motors, and as its carriage 82 is displaced in accordance with the target's estimated speed, the operation of shaft 22 also drives shaft 70, the center 69''' and side 69'' of differential 69, shaft 71, differential 72, shaft 73 and pinion 86 in accordance with the target's estimated course. Therefore, the pinion 86 and the disc 78 turn in unison. Since the carriage 82 is carried around with disc 78 and the pinion 86 is turning in unison with this disc, there is no relative movement between the pinion 86 and carriage 82 whereby the latter is not displaced to alter the value of the estimated target's speed in accordance with which it has been set.

The description of the structure and function of the correctional mechanism will be introduced by an explanation of the problem involved as illustrated in Figs. 5 to 8 inclusive.

Figure 5:
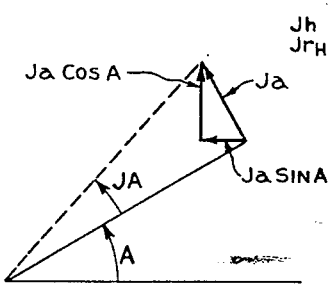
Figs. 5, 6, 7, 8 and 9 are another series of related diagrams to be used in connection with an explanation of another problem involved herein.

Fig. 5 is an elevational view representing the problem as viewed from a distant point at right angles to the horizontal projection of the line of sight, which in this case is located at an angle of elevation A above the surface of the earth. When the generated value of elevation does not agree with the observed value of elevation, a correction JA in the generated value of elevation A is required, as is a change in the rate of generation of elevation. Accordingly, an arbitrary relationship is established between the angular correction in elevation JA and the linear rate correction in elevation, Ja. A change in the linear rate correction in elevation, Ja, is, therefore, of an arbitrary character. Hence, an arbitrary change in the linear rate correction in elevation, Ja, is given to a definite amount of angular correction in elevation, JA.

In Fig. 5, the line Ja, which lies in the vertical plane including the line of sight and is perpendicular to that line, represents the linear rate correction in elevation which is required to cause the generated value of elevation rate to match the observed value of elevation rate, and its value therefore depends upon the elevation correction JA in unit of time and upon the range. For the purpose of this invention the line Ja is resolved into a horizontal component $Ja \sin A$ and a vertical component $Ja \cos A$.

Figure 6:
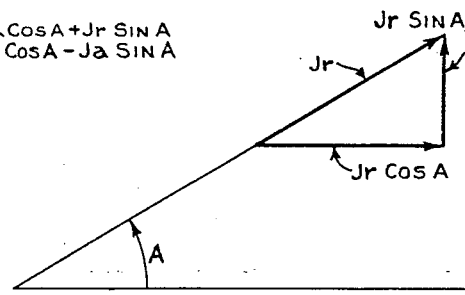

In the similar elevational view of Fig. 6 the line Jr which lies along the line of sight making an angle A to the horizontal represents the rate correction in range along the line of sight, this range usually being known as the slant or direct range as distinguished from the horizontal range $R_H$ of Figs. 1, 2 and 3. In other words, the line Jr represents the rate correction in range which is required to cause the generated value of range to match the observed value of range. As in the case of Fig. 5, the line Jr is resolved into a horizontal component $Jr \cos A$ and a vertical component $Jr \sin A$.

Figure 7:
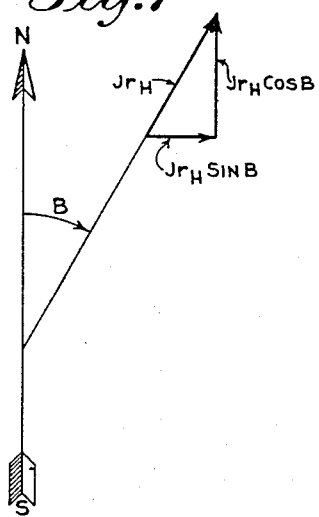

The sum of the vertical components of Ja and Jr represents the net rate correction in climb, Jh, so that (6) $\qquad Jh = Ja \cos A + Jr \sin A$ The combination of the horizontal components of Ja and Jr represents the net rate correction in horizontal range, $Jr_H$. These components are subtractive because $Ja \sin A$ acts to decrease range rate when Ja is positive so that (7) $\qquad Jr_H = Jr \cos A - Ja \sin A$ Fig. 7 is a plan view representing the problem as viewed from a distant point above the surface of the earth. In this diagram the North-South line is designated N—S. The line $Jr_H$ which represents the rate correction in horizontal range lies at an angle B to the line N—S, this angle representing the true bearing of the target with respect to own ship. The line $Jr_H$ is resolved into a component $Jr_H \cos B$ parallel to the line N—S and an East-West component $Jr_H \sin B$.

Figure 8:
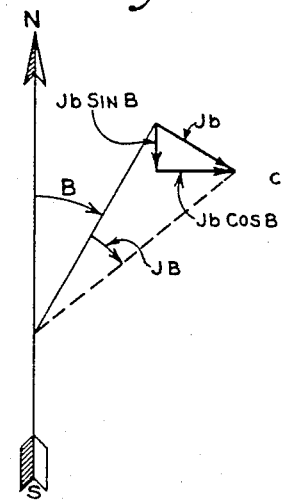

Fig. 8 is a plan view similar to Fig. 7 in which the line Jb lying in a horizontal plane and perpendicular to the line lying at an angle B with respect to the line N—S, represents the linear rate correction in bearing which is required to cause the generated value of bearing to match the observed value of bearing, and its value therefore depends upon the bearing correction JB in unit of time and upon the range. The line Jb is resolved into a North—South component $Jb \sin B$ and an East-West component $Jb \cos B$.

The sum of the North-South components of Figs. 7 and 8 represents the net rate correction in the North-South direction, that is, $Jr_H \cos B - Jb \sin B$.

The sum of the East-West components of Figs. 7 and 8 represents the net rate correction in the East-West direction, that is, $Jr_H \sin B + Jb \cos B$.

While the invention contemplates the use of any suitable devices for resolving the above mentioned quantities into components and performing the required multiplication, a device for this purpose, hereinafter referred to as a component integrator, will be shown and described in a simplified manner.

Since four of these devices are employed in the apparatus disclosed herein they will be designated as units 97A, 97B, 97C and 97D and like elements of the devices will be denoted by like reference numerals in the four units.

Figure 10A:
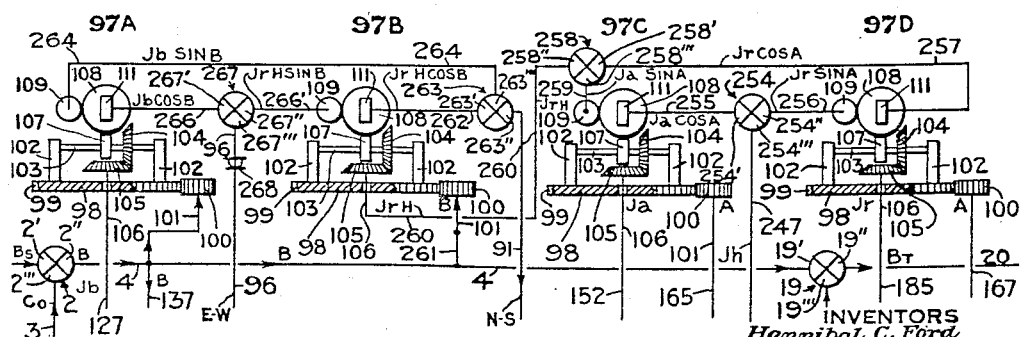
Fig. 10a is a portion of Fig. 10 on an enlarged scale.

As shown most clearly in Fig. 10a, each device includes a rotatable base 98 having a peripheral gear 99 engaged by a pinion 100 on a shaft 101 operable in accordance with an angular input, such as bearing or elevation. The base carries a pair of standards 102 rotatably supporting a shaft 103 having a bevel gear 104 engaging a similar gear 105 on the end of a shaft 106 operable in accordance with another input quantity, such as a correctional factor.

The shaft 103 also carries a roller 107 engaging a ball 108 suitably supported and adapted to be rotated by the roller 107 about an axis parallel to the shaft 103 on which the roller is mounted. A roller 109 is fast on an output shaft, as for example, shaft 264 at the component integrator 97A. The roller 109 is suitably mounted in engagement with the ball 108, and so arranged that the movement imparted to it is in accordance with the product of the input of shaft 106 and the sine of the angular input of the shaft 101. A similar roller 111 is fast on an output shaft, as, for example, shaft 266 at the component integrator 97A. The roller 111 is so arranged that the movement imparted to it is in accordance with the product of the input of shaft 106 and the cosine of the angular input of the shaft 101.

A hand crank 113 for use in connection with the introduction of corrections JB in bearing B is attached to a shaft 114 which is mounted for rotational and longitudinal movement in a pair of fixed members 115 and 116. A collar 117 is attached to the shaft and coacts with a grooved member 118 loosely mounted on the shaft and against which one end of a spring 119 abuts, the other end of the spring abutting against a second collar 120 also attached to the shaft. Coacting with the member 118 is a latch 121 adapted to be held in either of the grooves by a spring 122 engaging a shoulder 123 on the latch and a fixed member 124, so establishing the desired position of member 118.

The free end of the shaft 114 carries a gear 125 adapted under certain conditions, as will hereinafter be explained, to engage a gear 126 on a shaft 127 leading to the shaft 106 of component integrator 97A, as indicated in Fig. 10a, a friction device 128 being provided to prevent unintentional displacement of the shaft. A wide gear 129 with which the gear 125 is at all times in engagement is attached to a shaft 130 provided with a friction device 131 and connected to one side 132′ of a differential 132, the other side 132″ of which is connected to a shaft 133 extending to the portion of the instrument shown in Fig. 11. The center 132‴ of the differential is connected to a shaft 134 terminating in one element 135 of a comparing device, the coacting element 136 of which is attached to a shaft 137 connected to shaft 4 which is movable in accordance with the true bearing of the target B as explained above. The shaft 101 of the component integrator 97A is connected to the shaft 4, so that its plate 98 is turned by the pinion 100 also in accordance with the true bearing, B, of the target.

A hand crank 138 for use in connection with the introduction of corrections JA in elevation A is attached to one end of a shaft 139 which is mounted for rotational and longitudinal movement in a pair of fixed members 140 and 141. A collar 142 is attached to the shaft and coacts with a grooved member 143 loosely mounted on the shaft and against which one end of a spring 144 abuts, the other end of the spring abutting against a second collar 145 attached to the shaft. Coacting with the grooved member 143 is a latch 146 adapted to be held in either of the grooves by a spring 147 engaging a shoulder 148 on the latch and a fixed member 149.

The other end of shaft 139 carries a gear 150 adapted under certain conditions of operation to engage a gear 151 on the end of a shaft 152 leading to the shaft 106 of component integrator 97C, as indicated in Fig. 10a, a friction device 153 being provided on the shaft 152. The gear 150 under other conditions may engage a gear 154 on the end of a shaft 155 which also carries a gear 156 adapted to engage a second gear 157 on the shaft 139 when gears 150 and 151 are engaged. The shaft 155 carries a part of a friction coupling 158, the other part of which is attached to a shaft 159 connected to one side 160′ of a differential 160, the other side 160″ of which is connected to one element 161 of a comparing device, the other element 162 of which is attached to a shaft 163 which is operable in accordance with observed values of elevation A and from which a shaft 164 extends to the portion of the instrument shown in Fig. 11. Branching from shaft 164 is a shaft 165 leading to the pinion 100 of the component integrator 97C, the plate 98 of which accordingly receives a displacement representing the elevation angle A. The center 160''' of differential 160 is connected to a shaft 166 leading to Fig. 11. Another branch 167 connects shaft 164 to the pinion 100 of component integrator 97D.

A hand crank 168 for use in introducing corrections $J_R$ in range R is attached to one end of a shaft 169 which is mounted for rotational and longitudinal movement in a pair of fixed members 170 and 171. A collar 172 is attached to the shaft and coacts with a grooved member 173 loosely mounted on the shaft and serving as an abutment for one end of a spring 174, the other end of which coacts with a collar 175 also attached to shaft 169. A latch 176 coacts with member 173, being normally held in one of its grooves by a spring 177 engaging a shoulder 178 on the latch and a fixed member 179.

The other end of shaft 169 has a gear 180 loosely mounted thereon but connected thereto by a yieldable device 181 to normally turn with the shaft, but to also take care of any excess load. Under certain conditions of operation the gear 180 is engaged with a gear 182 on a shaft 183 to which a friction device 184 is applied. Connected to the shaft 183 is another shaft 185 leading to the input shaft 106 of the component integrator 97D, as indicated in Fig. 10a. The shaft 183 terminates in a pinion 186 coacting with a peripherally toothed rotatable disc 187 forming part of a variable speed device comprising a range error integrator as it will be hereinafter referred to. Coacting with the disc 187 is a pair of balls 188 in a carriage 189 displaceable radially of the disc as will be subsequently explained. A roller 190 coacts with the balls. This device may be of the type shown in Patent No. 1,317,915, Hannibal C. Ford, for Mechanical Movement, and is shown herein in simplified form.

Adapted to coact with gear 180 under certain conditions is a gear 191 on a shaft 192 having a friction device 193 and connected to one side 194' of a differential 194, the center 194''' of which is connected by a shaft 195 to a shaft 196 carrying at one end a member 197 of a comparison device, the other member 198 of which is carried by a shaft 199 operable in accordance with observed values of range as obtained by a range finder, and designated $R_O$. The shaft 196 also extends to the mechanism of Fig. 11. The other side 194'' of differential 194 is connected by a shaft 200 to one side 201' of a differential 201, the other side 201'' being connected to a shaft 202 leading to the mechanism of Fig. 11. The center 201''' is connected to a shaft 203 leading to the roller 190 of the range error integrator.

The shaft 169 to which the crank 168 is attached carries a collar 204 adapted when the shaft is displaced longitudinally to control the longer blade of a switch 205 which controls the circuit of a magnetic clutch shifter 207. This circuit extends from the positive side of the electric current supply line by conductors 39', 213 and 213', switch 205, conductor 206 to and through the field winding of the clutch shifter 207, and therefrom by conductors 208 and 27 to the minus side of the current supply line.

The armature of clutch shifter 207 carries a crank 214 having at its free end a pin fitting in a groove in the shiftable element of a clutch 215 which is connected by a shaft 216 to a pinion 217 engaging a gear 218 of an energy storing device, to a stationary member 221 of which one end of a spring 219 is attached, the other end of the spring being attached to the hub of gear 218 which is fast on shaft 220. The shaft 220 passes through an aperture in the fixed member 221 and carries an arm 222 adapted to engage one or the other of a pair of stops 223 attached to the member 221. The shaft 220 terminates in a pinion 224 engaging a rack bar connected to the ball carriage 189 of the range error integrator.

The armature of time motor 210 is connected by a shaft 225, a yieldable coupling 226 and a shaft 227 to the fixed element of clutch 215. It is also connected by a shaft 228 to one side 229' of a differential 229, the other side 229'' of which is connected by a shaft 230 to a time-controlled escapement device 231. The center 229''' is connected to the movable element or arm 232 of switch 212. These elements constitute a regulator for keeping constant the speed of the time motor and a shaft 233 leading from the armature shaft 225 to the mechanism of Fig. 11. It will be understood that any other suitable device may be used for this purpose; for example, the mechanism of Patent No. 1,577,618.

For the purpose of introducing the factor of rate of change of height, designated $dH$, and for taking care of diving conditions of an aerial target, there is provided a combination mechanism denoted generally by 234. This mechanism includes a hand crank 235 on a shaft 236 which fixedly carries a member 237 provided with a pair of grooves with which a latch 238 coacts. The latch is normally held in one of the grooves by a spring 239 between a shoulder 240 on the latch and a fixed member 241. A friction device 242 engages the member 237 to prevent unintentional displacement of certain of the movable members of the mechanism.

The inner end of the shaft 236 carries a gear 243 loosely mounted thereon, but adapted to be driven therewith by a yieldable coupling device 244 under normal conditions of operation of hand crank 235. The gear 243 is adapted under certain conditions to engage a gear 245 on a shaft 246 leading to the mechanism of Fig. 11, in which case the crank 235 and the parts connected thereto will be operated in accordance with the estimated diving speed of the target, designated $S_T'$.

A shaft 247 having a friction device 248 passes through an aperture in a fixed member 249 and carries at its free end a gear 250 having its hub slidably mounted on the shaft in any suitable manner and normally urged against the adjacent end of shaft 236 by a spring 251 between the member 249 and the hub of the gear 250. Under the shown conditions the gear 250 engages a gear 252 at the end of a shaft 253 leading to Fig. 11 and is operable in accordance with the net rate of climb correction, $Jh$.

The other end of shaft 247 is connected to the center 254''' of a differential 254, the sides 254' and 254'' of which are connected by shafts 255 and 256 to the output rollers 111 and 109 respectively of the component integrators 97C and 97D, the legends showing the quantities thus applied to the differential 254 as inputs thereto. The output roller 111 of component integrator 97D is connected by a shaft 257 to one side 258' of a differential 258, the center 258''' of which is connected by a shaft 259 to the output roller 109 of component integrator 97C. The other side 258'' is connected by a shaft 260 to the input shaft 106 of component integrator 97B. The input pinion 100 of this device is connected by a shaft 261 to shaft 4. The output roller 111 of component integrator 97B is connected by shaft 262 to one side 263' of a differential 263, the center 263''' of which is connected by a shaft 264 to the output roller 109 of component integrator 97A. The other side 263'' is connected to the shaft 91 leading to the vector solver 29, a yieldable coupling 265 being inserted in the shaft. The output roller 111 of component integrator 97A and the output roller 109 of component integrator 97B are connected by shafts 266 and 266' to the sides 267' and 267'' respectively of a differential 267, the center 267''' of which is attached to the shaft 96 leading to the vector solver 29 and which has a yieldable coupling 268 therein.

Referring to Fig. 11 the shaft 253 leading from the mechanism 234 of Fig. 10 is connected to one side 269' of a differential 269, the other side 269'' of which is connected by a shaft 270 to a shaft 271 which leads to the shaft 164 operable in accordance with values of elevation A. A shaft 272 connected to shaft 271 leads to a pinion 273 forming part of a component solver 274 which is shown in simplified form like the component solver 21 and the vector solver 29. The pinion engages a peripherally toothed disk 275 which carries a pair of diametrically arranged lugs 276 within which is mounted a screw shaft 277 having at one end a gear 278 engaging a gear 279 on a shaft 280 carried by the disk 275 and disposed parallel to the screw shaft 277. The other end of shaft 280 carries a gear 281 engaging a gear 282 concentrically arranged with respect to the disk 275 and adapted to be rotated by a shaft 283 leading to the center 269''' of differential 269. A pin 284 is mounted in any suitable manner upon the screw shaft 277 to be moved radially of the disk 275 by rotation of the screw shaft. The pin passes through a slot 285 in an arm of a T-shaped slide 286, the other arm of which is provided with a rack engaging a pinion 287 on an output shaft 288. The pin 284 also passes through a slot 289 in an arm of another T-shaped slide 290 disposed to move perpendicularly to slide 286 and having a rack on its other arm engaging a pinion 291 on a second output shaft 292.

In the operation of the component solver 274 just described and assuming that values of elevation A are being introduced by shafts 164, 271 and 272 and pinion 273, the disk 275 will be correspondingly turned. Assuming the shaft 253 to be normally fixed the side 269' of differential 269 will be fixed. The rotation of shafts 164 and 271 will turn the side 269'' and the center 269''' so that the shaft 283 will turn the gear 282 in unison with the disk 275 so that no motion will be imparted to the gear 281 and the radial position of the pin 284 will be unaltered, as should be the case since the input shaft 253 is assumed to be fixed.

On the other hand, if the input shaft 164 be regarded as fixed and the input shaft 253 be turned in accordance with changing values of $dH$, the side 269'' of the differential 269 will be fixed so that the movement imparted to the side 269' from the shaft 253 will move the center 269'''. The shaft 283 will be turned accordingly and drive the gear 282 to position the pin 284 radially of the disk 275 which will under the above conditions be fixed. The apparatus is so arranged that the displacement of slide 290 and shaft 292 will be in accordance with the quantity $dH \sin A$ while the displacement of slide 286 and shaft 288 will be in accordance with the quantity $dH \cos A$.

The shaft 68 entering Fig. 11 from Fig. 10 is connected to the side 293' of a differential 293 the other side 293'' of which is connected by a shaft 294 to the shaft 164 operable in accordance with values of elevation A. A shaft 295 is connected between shaft 164 and a pinion 273' for actuating a disk 275' of a second component solver 274' which is structurally identical with component solver 274 and in which similar elements are designated by corresponding reference numerals but with primes affixed. The center 293''' of differential 293 is connected by a shaft 283' to the gear 282' of the component solver 274'.

In the component solver 274' the pin 284' is positioned radially of the disk 275' in accordance with the quantity $dR_H$. The displacement of slide 286' and shaft 288' will be in accordance with the quantity $dR_H \sin A$, while the displacement of slide 290' and shaft 292' will be in accordance with the quantity $dR_H \cos A$.

As far as the differential 293 is concerned, it is identical with and performs the same function as does the differential 269 associated with component solver 274.

The output shaft 292 of the component solver 274, operable in accordance with the quantity $dH \sin A$, is connected to the side 296' of a differential 296, the other side 296'' of which is connected by the shaft 292' to the pinion 291' operable in accordance with the quantity $dR_H \cos A$. The center 296''' operates a shaft 297 in accordance with the sum of these two quantities, which as appears from Equation 1 above, gives the quantity $dR$ representing the rate of change of range. The shaft 297 is connected to one side 298' of a differential 298, the center 298''' of which is connected to the shaft 246 operable in accordance with the estimated diving speed of the target, $S_{T'}$, from the mechanism 234 of Fig. 10. A shaft 299 connects the other side 298'' to another variable speed mechanism 300 hereinafter designated "a range integrator." A shaft 301 leads to the predicting apparatus which may be associated with this apparatus.

The shaft 299 carries a pinion 302 engaging a rack bar 303 for adjusting radially of a disc 304 a carriage 305 containing a pair of balls 306. The disc is driven by a pinion 307 on a shaft actuated in accordance with time, $t$, which may be the shaft 233 leading from the time motor 210. The movement imparted to the balls 306 from the disc 304 is transmitted to a roller 308 which is connected to the shaft 202 leading from Fig. 10. Since the disc 304 is driven in accordance with time and the movement imparted to the roller 308 depends upon the radial position of the balls with respect to the disc, i. e. upon the quantity $dR$, the output of the roller 308 will be in accordance with the product of those quantities, or $\Delta R$ representing increments of range.

The shaft 196 leading from Fig. 10 and operable in accordance with range, $R$, is in Fig. 11, connected to a pinion 309 engaging a rotatable disc 310 provided with a cam groove 311 laid out radially in accordance with the reciprocal of range, i. e., $$\frac{1}{R}$$

Above the disc is a pair of fixed guideways 312 within which is a slide 313 carrying a pin 314 fitting into the cam groove and therefore displaceable radially in accordance with the quantity $$\frac{1}{R}$$

as the disc is rotated in accordance with the quantity $R$. The slide 313 is connected by a rod 315 to a carriage containing a pair of balls 316 of an integrator 317, hereinafter referred to as the $$\frac{1}{R}$$

integrator, the disc 318 of which is driven by a pinion 319 on the shaft 233 in accordance with time, $t$. The roller 320 is therefore driven at a variable speed in accordance with a function of $$\frac{1}{R} \text{ and } t, \text{ or } \int \frac{dt}{R}$$

which is the output of its shaft 321.

The output shaft 288 of component solver 274, operable in accordance with the quantity $dH \cos A$, is connected to the side 322' of a differential 322, the other side 322'' of which is connected to the output shaft 288' of component solver 274' which is operable in accordance with the quantity $dR_H \sin A$. The center 322''' is therefore actuated in accordance with the algebraic sum of these quantities or in accordance with $RdA$ as appears from Equation 2. The center 322''' is connected by a shaft 323 to a pinion 324 engaging a rack bar 325 to shift the carriage and the balls 326 of an integrator 327 hereinafter referred to as the elevation integrator. The disc 328 of this integrator is driven by a pinion 329 of the shaft 321 which is operable in accordance with the quantity $$\int \frac{dt}{R}$$

The output of the roller 330 and the shaft 166 connected thereto is in accordance with the product of the quantities $RdA$ and $$\int \frac{dt}{R}$$

which gives increments of elevation $\Delta A$. A shaft 331 leads from shaft 323 to the predicting apparatus which may be associated with this apparatus.

The shaft 271 operable in accordance with elevation A drives a pinion 332 engaging a toothed disc 333 having a cam groove 334 representing values of the secant of A. A pair of guideways 335 carry a slide 336 having a pin 337 fitting into the cam groove and displaceable radially in accordance with values of secant A as the disc 333 is turned. By means of a rod 338 this motion is transmitted to a carriage and a pair of balls 329 of an integrator 340, known as the secant integrator, the disc 341 of which is driven by a pinion 342 on the shaft 321 operable in accordance with $$\int \frac{dt}{R}$$

The roller 343 is driven in accordance with the product of the quantities secant A and $$\int \frac{dt}{R}$$

which is transmitted by a shaft 344 to a pinion 345 and a toothed disc 346 of an integrator 347 known as the bearing integrator. The carriage and the balls 348 of this integrator are positioned by a rack bar 349 with which a pinion 350 engages, the pinion being carried by a shaft 351 connected to the shaft 63 leading from the component solver 21 of Fig. 10. The movement imparted to the roller 352 of this integrator will be in accordance with the product of the quantities $$\int \frac{dt}{R}, \text{ sec } A \text{ and } RdB_N$$

which will give increments of bearing ΔB which are transmitted by shaft 133 leading to Fig. 10, the multiplier sec. A serving to correct the bearing angle from the slant plane including the line of sight on an elevated target to the horizontal plane.

In the operation of the apparatus described above, and assuming that the true course of the target and its horizontal speed have been estimated, the former will be introduced into the apparatus by withdrawing the latch 11 from the groove in member 9 in which it normally lies, manipulating the crank 5 to shift the shaft 6 longitudinally until the latch can be inserted in the other groove, at which time the gear 7 will engage the gear 8, and turning the crank as required. At the same time the inner end of shaft 6 will engage the longer blade of the switch 14 to open the circuits of the motors 18 and 41. The movement imparted to the crank 5 will be transmitted by shaft 17 to the center 19''' of differential 19 in which it will be combined with the true target bearing B which is transmitted by shaft 4 to one side 19' of the differential. The resultant thereof will be represented by the movement of the other side 19'', shaft 20 and pinion 57 to correspondingly rotate the disc 55 of the component solver 21 in accordance with the estimated target angle $B_T$.

Simultaneously with the operations described above the branch shaft 22 will be correspondingly turned to operate the side 23' of differential 23, the other side 23'' of which may be assumed to be fixed so that the center 23''' is moved until the arm 24 engages one of the fixed contacts 25 after which the shaft 28 will in effect be directly driven from shaft 22 to position by pinion 80 the disc 78 of the vector solver 29 in accordance with the estimated true course of the target. The crank 5 and its associated elements will ordinarily be restored to their normal relationship, as shown in Fig. 10, after the above quantity has been introduced into the instrument.

Upon such restoration of the crank 5, switch 14 will be closed and will establish the circuit of motor 18 from the positive time conductor through the conductor 39', closed switch 39, conductor 15, now closed switch 14, conductors 16 and 16', the arm 24 and the contact 25 with which the arm has been left in engagement as a result of the initial operation of crank 5 and its associated elements, one of the conductors 26, motor 18, and conductor 27 leading from the common terminal of the motor to the minus line conductor. The motor will be energized and by shafts 17 and 22, the side 23' of differential 23 will be turned. Assuming the other side 23'' to be fixed the center 23''' will be correspondingly turned until the arm 24 leaves the contact 25 with which it is in engagement, whereupon the motor will cease rotating.

The estimated horizontal speed of the target will be introduced by manipulating crank 30 to longitudinally displace the shaft 31 until the gears 36 and 38 are in engagement and the switch 39 has been opened to break the circuits of the motors 41 and 18. Spring 33 will automatically restore the parts to their normal relationship, as shown in Fig. 10, when the crank is released.

Rotation of the crank 30 will through shaft 31, gears 36 and 38, shafts 40 and 42, differential 44, shaft 46 and pinion 52, correspondingly turn the disc 50 of the component solver 21 to radially position the pin 54 in accordance with the estimated horizontal speed of the target, the pin having been positioned angularly in accordance with the target angle. As a result of these operations the slides 60 and 65 are displaced in accordance with the quantities $RdB_N$ and $dR_H$ respectively.

Simultaneously, the shaft 40 will through differential 69 drive one side 72' of differential 72 and its center 72''' until the arm 74 engages one of the fixed contacts 75 after which there will be in effect a direct drive to the other side 72'' and the shaft 73 leading therefrom to pinion 86 of the vector solver 29 to position pin 84 radially in accordance with the estimated horizontal speed of the target, the pin already having been positioned angularly in accordance with the estimated true course of the target as explained above. As a result of these operations the slides 88 and 93 will be displaced in accordance with the N—S and E—W components of the estimated true course and the horizontal speed of the target.

The friction couplings 265 and 268 will be so designed with respect to the inertia of the component integrators and the elements associated therewith that the couplings will yield during the above described initial operations of positioning the slides 88 and 93 in accordance with such components. The vector solver during this operation is in effect an idle component solver in so far as any outputs from its slides are concerned. The couplings will also be designed to yield at low target speeds or when the target set-up is being changed manually. The couplings will on the other hand act as non-yielding connections in the shafts 91 and 96 when the shafts are being driven from the component integrators and their associated elements during the operation of repositioning the slides 88 and 93 and the pin 84 of the vector solver in connection with the application of corrections.

In addition to the preliminary operations described above others are required in order that the values of other factors upon which the solution of the particular problem depends may be introduced initially in accordance with observed values of these factors, and which from time to time are corrected by the mechanism disclosed herein.

One of these factors is the true bearing of the target, B, which as described above is indicated by the element 136 of a comparison device, the other element 135 of which is moved by shaft 134 from the center 132''' of differential 132, the side 132'' being assumed to be fixed. To effect this preliminary operation the crank 113 and shaft 114 will be moved outwardly until they occupy such a position that the gear 125 will be out of engagement with gear 126, but still in engagement with wide gear 129, so that by the rotation of the crank 113, shaft 114, gears 125 and 129, shaft 130, side 132' and center 132''' of differential 132, the shaft 134 may be driven until the element 135 coincides with element 136.

When the crank 113 is pulled outward as described, the practice is to retract the latch 121 from the left-hand groove of the member 118 before pulling the crank out. As the crank 113 and shaft 114 are pulled outward, the collars 117 and 120, being fast on the shaft, move with the latter. Inasmuch as the spring 119 bears against both the collar 120 and the grooved member 118, the latter, at such time, remains pressed against the collar 117 that is fast on shaft 114. Hence, with the latch 121 retracted, the crank 113, shaft 114, collars 117 and 120, the spring 119 and the grooved member 118 all move in unison to the position shown in Fig. 12. The latch 121 is then released from the operator's hand and the spring 122 forces the latch into the right-hand groove of member 118. The gear 125 is thus held out of mesh with gear 126 until the above mentioned preliminary operation is completed.

Thereafter, the latch 121 is again retracted to leave the right-hand groove. The crank 113 is then pushed in to reengage gears 125 and 126. The left-hand groove of member 118 is now once more in alignment with the latch 121, which is again inserted into this groove to maintain the gear engagement, as shown in Fig. 10.

There may be times when the generated bearing pointer 135 is only slightly out of coincidence with the observed bearing pointer 136, and it is desired to restore the coincidence without manipulating latch 121. In such cases, it is only necessary to pull crank 113 outward and turn the same the small amount required. Since, now, the latch 121 remains in the left-hand groove of member 118, as shown in Fig. 13, this member is held from outward movement, but the collar 120 fixed on shaft 114 moves outward with the latter compressing spring 119, as also shown in Fig. 13, which condition is maintained while the crank 113 is being turned to effect the small correction. When this minor correction is completed, the operator simply lets go of crank 113 whereupon the spring 119 pushes the collar 120 and shaft 114 inward automatically reengaging gear 125 with gear 126 in the relationship shown in Fig. 10.

The initial setting up of a value of generated range corresponding to an observed one is performed with the aid of the elements 197 and 198 of another comparison device, the latter element representing observed range $R_0$ and the former element being connected to the center 194''' of the differential 194, the side 194'' of which may be assumed to be fixed for the time being. The crank 168 and shaft 169 will be withdrawn from the positions shown in Fig. 10 to disengage the gears 180 and 182 and engage the former gear with gear 191 and shaft 192 leading to side 194' of the differential 194. The crank 168 will be turned until the elements 197 and 198 are matched after which the parts will be restored to their original positions in a manner similar to that described in connection with the bearing crank 113. The value of the quantity R will by means of shaft 196 be introduced into the $1/R$ device 310 appearing in Fig. 11. As in the case of the crank 113 and its associated elements, the mechanism under the control of crank 168 and shaft 169 may be correspondingly manipulated when minor corrections are to be made.

The introduction of the initial value of elevation A is accomplished by manipulation of the crank 138 and shaft 139 in a manner similar to that described in connection with the introduction of the other quantities entering into the problem. The crank and shaft are withdrawn from the positions shown in Fig. 10 until the pair of gears 150 and 151 and the pair of gears 156 and 157 are disengaged and the gear 150 is put into engagement with the gear 154. The subsequent rotation imparted to the crank, while it is in this outward position, is transmitted by gears 150 and 154, shaft 155, friction coupling 158 and shaft 159 to the side 160' of differential 160, the center 160''' being regarded as fixed, to correspondingly turn the other side 160'' and the indicating element 161 of a third comparison device attached thereto until it coincides with the other indicating element 162 which represents observed values of elevation A. After this preliminary operation has been performed, crank 138 will be pushed in to restore the parts to their relationship with each other, as shown in Fig. 10. The values of A will be transmitted by shaft 164 to the component solvers 274 and 274' and the secant A cam device 333 appearing in Fig. 11. Provision is made in the mechanism under the control of crank 138 for alternative modes of operation, as in the case of the other cranks 113 and 168 as described above.

Except in the case of a diving target, values of the quantity $d$H will be initially introduced by withdrawing the latch 238 from the left-hand groove in member 237 and then using crank 235 to longitudinally shift the shaft 236 until the latch can enter the right-hand groove in member 237. This shifting of shaft 236 will correspondingly displace the gear 250 from engagement with gear 252 and cause gear 243 to be disengaged from gear 245 and put into engagement with gear 252 whereby rotation of crank 235 in accordance with estimated values of $d$H will correspondingly rotate shaft 253 and the parts of the apparatus connected thereto, as shown in Fig. 11.

As explained above, the movement imparted to slide 60 of component solver 21 is transmitted by shafts and gears to position the balls 348 of the bearing integrator 347 which generates the bearing $\Delta$B which through shaft 133 moves the side 132'' of differential 132. Assuming the other side 132' to be fixed, the center 132''' will be correspondingly turned to displace the shaft 134 and the element 135. If this element departs from coincidence with its coacting element 136 it indicates that the observed and generated bearings do not agree. If the generated bearing is wrong it is due to errors in the rate at which this bearing is generated by the bearing integrator 347.

Since one of the inputs of this integrator is the quantity R$d$B$_N$, it may mean that there is an error in this factor which is due to errors in the estimated speed of the target or in the target angle B$_T$ as set up in the component solver 21 or in both quantities. In order to correct the error in the generated bearing it is necessary to correct the error in the R$d$B$_N$ output of the component solver which in turn requires a correction of the errors in the estimated target speed or in the estimated target angle or in both. Since the target angle is in part dependent upon the true bearing of the target, any correction to the true bearing as generated in the apparatus must be applied to the target angle in addition to any correction of the target angle due to errors in the estimated course or speed of the target.

Assuming that the elements under control of crank 113 have been restored to the position shown in Fig. 10 following the preliminary operation described above, the operator upon observing a departure from coincidence of the indicators 135 and 136 will manipulate the crank 113 and shaft 114 to restore a state of coincidence. This is accomplished by means of the gears 125 and 129, shaft 130, side 132' and center 132''' of differential 132 and shaft 134, the other side 132'' being assumed to be fixed for the time being.

The rotation of crank 113 to match the indicators 135 and 136 will also through shaft 114, gears 125 and 126 and shaft 127 introduce the linear bearing rate correction, designated J$b$, into the component integrator 97A to correspondingly displace the elements connected to the shaft. The ratio of the gearing represented by the gears 125, 126 and 129 is such that the angular movement of the shaft 127 does represent the rate correction when the bearing corrections are made at specified intervals of time for given ranges.

To simplify consideration of the functions of the component integrators it will first be assumed that the inputs and outputs of the component integrators, other than the particular one which is now under consideration, are the correct values of the quantities which are represented by these inputs and outputs. Considering the component integrator 97A, this means that the input B is being continuously and correctly introduced by shaft 101 from shaft 4 as well as by shaft 261 of component integrator 97B (see Fig. 10$a$). The same statement applies to the input A of the component integrators 97C and 97D as well as to the input J$_{TH}$ of component integrator 97B, the input J$a$ of component integrator 97C and the input J$r$ of component integrator 97D.

By virtue of differential 263 and the quantities combined therein there will be a resultant correctional displacement of shaft 91 which is connected to the side 263'' of the differential. Through friction coupling 265 and pinion 90 a corresponding correctional displacement of slide 88 of the vector solver 29 will take place. By virtue of the quantities combined in differential 267 a resultant correctional displacement of shaft 96 will take place since it is connected to the center 267''' of the differential. Through friction coupling 268 and pinion 95 correctional displacement of slide 93 of the vector solver will also take place.

As a result of the operations just referred to, the correctional displacements of the slides will reposition the pin 84 of the vector solver which will in turn displace the disc 78 angularly and the carriage 82 radially of the disc. The turning of the disc will through pinion 80, shaft 28 and side 23'' of differential 23 drive its center 23''' the other side 23' being regarded as fixed at that time.

The arm 24 will occupy its neutral position until the above described repositioning of the elements of the vector solver 29 takes place, whereupon the arm 24 which is attached to the center 23''' will reengage one of the contacts 25 to establish the circuit of motor 18. This will cause the motor through shaft 17, differential 19, shaft 20 and pinion 57, to drive the disc 55 of the component solver 21 to produce a correctional angular displacement of its pin 54. At the same time, the motor 18 will drive through shaft 22, the side 23' of differential 23 until its displacement matches the correctional displacement of the other side 23'' whereupon the arm 24 will occupy its neutral position and the motor will be deenergized.

An operation similar to that described above will take place in the case of the carriage of the vector solver 29 which will cause a correctional displacement of pinion 86, shaft 73 and the side 72'' of differential 72 to which it is connected to control the arm 74 and the motor 41 in a manner similar to that of the other motor 18, the ultimate result being the repositioning of the disc 50 of component solver 21 and the radial resetting of the pin 54. The repositioning of the pin 54 in accordance with the generated corrections in the estimated course and speed of the target causes a corresponding repositioning of the slides 60 and 66 with resultant changes in the outputs of the component solver. The changes in the R$d$B$_N$ output of shaft 63 will alter the position of the balls 348 of the bearing integrator 347 to change the output of the integrator as applied to shaft 133. Since this shaft is connected to the side 132'' of differential 132 and the other side 132' may be regarded as fixed, the center 132''' will through shaft 134 displace the indicator element 135 in accordance with the new generated true bearing. If the correctional operation described above has been properly performed this element will coincide with the comparison indicator element 136 showing the correctness of the generated true bearing of the target. If the indicators do not coincide the correctional operation should be repeated as many times as may be necessary to accomplish the desired result.

As previously explained, corrections for errors in the generated true bearing of the target may be made independently of its elevation, but in the case of corrections for errors in the generated range of the target, and in its generated elevation, the latter quantity enters as a factor for the following reasons.

Assume a target at a relatively low elevation, less than 45° for instance, and approaching or traveling away from the observing station at a substantially constant height or altitude. In such a case, errors in the estimated speed of the target will be manifest primarily by differences between the generated and observed ranges, since the component of movement along the line of sight will be relatively great as compared with the component of movement perpendicular to the line of sight in a vertical plane containing the line of sight. On the other hand, in the case of a similarly moving target at a relatively high angle of elevation, above 45° for instance, the errors in estimated speed will be manifest primarily by differences between the generated and observed elevations, since the component of movement along the line of sight will be relatively small as compared with the component of movement perpendicular to the line of sight in a vertical plane containing the line of sight.

The application of the range corrections is under the control of crank 168 and its associated elements which for this purpose occupy the relation shown in Fig. 10, i. e. with the gear 180 carried by shaft 169 in engagement with gear 182 carried by shaft 183 from which a branch shaft 185 transmits the correctional movement of the crank to component integrator 97D, as one of its inputs, designated $Jr$, the other input being the elevation angle $A$ introduced by shafts 164 and 167 and pinion 100. As in the case of the component integrator 97A, it will be likewise assumed in this case that the inputs and outputs of the other component integrators 97A, 97B and 97C are correct so that the range correction ultimately represented by the repositioning of the slides 88 and 93 of the vector solver 29 is dependent solely upon the original errors in this factor itself.

As distinguished from bearing and elevation readings which are usually obtained continuously, by suitable observation instruments, such as directors, range finder readings are ordinarily obtained intermittently. The present apparatus includes devices for determining and applying the range rate error for the elapsed time between readings.

Manipulation of crank 168 in setting the associated parts in condition for rate control permits the blades of switch 205 to engage each other to establish the circuit of the clutch shifter 207 that controls the clutch 215 in the operating connection from time motor 210 to the range error integrator that includes the elements 187 to 190. The time motor 210 runs continuously by virtue of its circuit, which extends from the positive side of the current supply line by conductors 39′ and 213, the contacts of switch 212, conductor 211 to and through time motor 210, and returns by conductors 209, 208 and 27 to the minus side of the current supply line.

The previously referred to establishment of the circuit of the clutch shifter 207 through conductors 39′, 213 and 213′, switch 205, conductor 206, the clutch shifter 207 and conductors 208 and 27 causes engagement of the elements of clutch 215 to permit the time motor to drive shafts 225 and 227, clutch 215, shaft 216, pinion 217, gear 218, shaft 220 and pinion 224 to shift ball carriage 189 and the balls 188 therein radially of the disc 187. The parts are so designed that the time motor will drive the balls of the ball carriage from the center of disc 187 to the periphery thereof during the maximum interval of time between the receipt of the range finder readings.

While the ball carriage 189 is being positively driven by the time motor torsional energy will be stored in the spring 219. Upon completion of each range finder observation and the correctional operations depending thereon, the crank 168 will be momentarily withdrawn sufficiently to permit the collar 204 to open the switch 205 and break the circuit of the clutch shifter 207, whereupon the elements of clutch 215 will be disengaged. The energy stored in spring 219 will then be expended in carrying the ball carriage back to its normal position at the center of disc 187, one stop 223 being disposed to effect this limitation of movement. Similarly the other stop 223 limits the outward movement of the ball carriage, further rotation of the drive shaft 225 resulting in slippage of the friction coupling 226.

The shaft 183 transmits the correctional movement of the crank 168, $Jr$, to pinion 186 to correspondingly turn the disc 187. The ball carriage being positioned in accordance with the time interval that has elapsed since the previous reading from the range finder, the ouput of the roller 190, designated $JR_c$, is the change in range during that interval. This output is introduced into the apparatus by the differential 201 wherein it is combined with the generated range $\Delta R$ represented by the movement of shaft 202, the resultant being represented by the movement of shaft 200, which through differential 194 correspondingly modifies the indicating element 197 in accordance with the generated range during the interval between the range finder observations. Consequently, the movement of the crank 168 which is required to match the generated and observed ranges at the comparison elements 197 and 198, will be the change in range divided by the elapsed time, that is, the range rate correction $Jr$.

Since the $dR$ input of the range integrator 300 is dependent in part upon the quantity $dR_H \cos A$ as obtained from the component solver 274′, an error in the quantity $dR_H$ will affect the $dR$ input of the range integrator and accordingly its $\Delta R$ output.

When this output as applied to shaft 202 and differential 194 causes the indicating elements 197 and 198 to remain in coincidence it will show that the generated range is correct and that the estimated course and speed of the target which serve as a basis for this generated range are also correct.

Assuming the crank 138 and the elements controlled thereby are in condition for the introduction of corrections in elevation $A$, as shown in Fig. 10, any departure of the indicating element 161 from coincidence with the indicating element 162 shows that the observed and generated elevation angles do not agree due to errors in the rate at which this quantity is being generated by the elevation integrator 327. Since one of the inputs of this integrator is the quantity $RdA$ which depends in part upon the quantity $dR_H \sin A$, any error in the quantity $dR_H$, due to an incorrect estimate of the speed of the target or of the target angle as set up on the component solver 21 or of both, will affect the output of the elevation integrator. The error in the generated elevation rate may, therefore, be corrected by repositioning the pin 54 of the component solver 21 to correspondingly change its $dR_H$ component to alter the output of the elevation integrator until the indicating elements 161 and 162 maintain substantial coincidence.

If indicating elements 161 and 162 fail of coincidence, the crank 138 will be turned to apply to shaft 139, gears 150 and 151 and shaft 152, a correctional displacement in linear elevation rate, designated $Ja$, the gear ratio being so designed that shaft 152 is turned in proportion to the rate correction when the elevation corrections are introduced at specified time intervals for given ranges. This displacement will be applied to component integrator 97C as one of its inputs, the other input being the elevation $A$ applied by shaft 165 and pinion 100. As in the case of the other component integrators it will be assumed that their inputs and outputs have the required accuracy so that the changes in the slides 88 and 93 of the vector solver 29 and the resulting repositioning of its pin 84 represent the corrections required to overcome the errors in the initial set-up of these elements in so far as elevation is concerned.

In a manner similar to that previously described in connection with the corrections in bearing, the repositioning of the pin 84 of the vector solver will cause a corresponding correctional displacement of the pin 54 and the slides 60 and 65 of the component solver 21 with consequent change in the $dR_H$ output applied to shaft 63 from the latter slide. This displacement of the shaft will affect the position of the pin 284′ of the component solver 274′ and this in turn will affect the position of the slide 286′ and the movement of shaft 288′ which represents the quantity $dR_H \sin A$.

As a result of this operation, the $RdA$ input of the elevation integrator 327, as represented by the movement of shaft 323, will be altered to change the output $\Delta A$ as represented by the movement of shaft 166. The latter shaft will, through the center 160‴ and side 160″ of the differential 160, displace the side 160″ and the indicating element 161 connected thereto more nearly into coincidence with the indicating element 162, depending upon the accuracy with which the correcting operation has been carried out. The continued coincidence of the elements will show that the elevation A as generated in the apparatus corresponds to the observed elevation.

It has previously been explained that the differential 254 receives inputs from the component integrators 97C and 97D and gives an output to shaft 247 which represents the net rate of climb correction, designated J$h$.

When the crank 235 is in its diving speed position, as shown in Fig. 10, the spring 251 forces the gear 250 into mesh with gear 252. Rotation of crank 235 in accordance with the estimated diving speed of the target, $S_{T'}$, will not, however, in these circumstances, effect a drive from shaft 236 to the gears 250 and 252, since the rounded end of shaft 236 merely bears against the hemispherical end of the hub of gear 250, there thus being no driving connection between shaft 236 and gear 250. However, under these conditions there is an operative connection between shaft 247 and gears 250 and 252 whereby the automatic introduction of the correction J$h$ to the estimated rate of climb, $d$H, is effected from shaft 247 through gears 250 and 252, resulting in the displacement of the rate of climb shaft 253 in accordance with such automatic correction, J$h$.

When it is desired to introduce the estimated rate of climb, $d$H, of the target, or to make arbitrary changes in this rate, the crank 235, as previously explained, is pushed in so that latch 238 is entered into the right-hand groove in member 237. This results in shaft 236 carrying gear 243 out of mesh with gear 245 and into mesh with gear 252, gears 245 and 250 being respectively out of mesh with gears 243 and 252. Hence, operation of crank 235, under these conditions, drives shaft 236, gears 243 and 252, so operating the $d$H shaft 253 in accordance with the initial setting or arbitrary corrections to the rate of climb, $d$H.

When the target makes a diving attack, the gears being in the relationship shown in Fig. 10 in consequence of the crank 235 being in its diving speed position, this crank is turned in accordance with the estimated diving speed of the target, $S_{T'}$, as previously stated. At such times, the end of the shaft 236 simply turns against the hemispherical end of the hub of gear 250, so that only gears 243 and 245 turn in response to the turning of crank 235 in accordance with the estimated diving speed of the target, thus driving shaft 246 independently of shafts 247 and 253. Shaft 246 accordingly actuates the center 298''' and side 298'' of differential 298 (see Fig. 11) to operate the range rate shaft 299 in correspondence to the estimated diving speed of the target, $S_{T'}$, instead of the computed range rate, $d$R, the diving speed of the target being too fast to permit calculation of the range rate.

Figure 9:
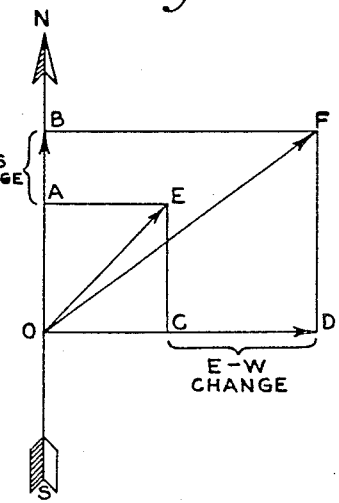

Fig. 9 represents diagrammatically the above described operation of the instrument to introduce automatically changes in the vector solver 29. Assume the original set-up of the target course and speed to be represented by the vector O—E, then the N—S component is O—A and the E—W component is O—C. These components represent the original positions of the vector solver slides 88 and 93 respectively. Let rate control corrections be made which result in a N—S change equal to A—B and an E—W change equal to C—D, this causes target course and speed to change to a new set-up represented by the vector O—F.

The operations have of necessity been described as taking place consecutively in a certain order, but it will be understood that in practice they may take place in any order or even more or less simultaneously according to the dictates of the fire control problem which is to be solved by the apparatus. In any event, the result will be the accurate determination of the course and speed of the target in order that these factors may serve as a basis for the accurate determination of other quantities dependent upon them, such as the rate of change of bearing $d$B$_\text{N}$, the rate of change of range $d$R and the rate of change of elevation $d$A. These outputs of the apparatus are transmitted to other mechanism for predicting the future position of the target, which mechanism since it forms no part of the present invention is not shown herein. The apparatus further enables the generated values of bearing B, range R and elevation A to be kept substantially correct in order that the information furnished by these quantities may be available whenever the values of these quantities cannot be obtained by direct observation of the target.

We claim:

1. In computing apparatus, the combination of a pair of mechanical vectors, means for positioning one of the vectors with respect to a predetermined datum and the other vector with respect to a predetermined datum differing from the first datum, a pair of elements operable by one of the vectors for resolving it into components having predetermined relations with respect to the datum of said vector, a second pair of elements operable by the other vector for resolving it into components having predetermined relations with respect to the datum of said other vector, means for applying correctional displacement to the elements of one of the pairs of elements to reposition the vector with which they are associated, and means under the control of the repositioned vector for correspondingly repositioning the other vector with respect to its datum.

2. In computing apparatus, two mechanical vectors each including two component elements operatively related thereto, a setting means operable to produce motion representative of direction of movement of an object with respect to a fixed datum, means for transmitting said motion to one vector, means for modifying said motion to represent direction of movement of said object with respect to a variable datum, and means for transmitting the modified motion to the other vector.

3. In computing apparatus, two mechanical vectors each including two component elements operatively related thereto, a setting means operable to produce motion representative of direction of movement of an object with respect to a fixed datum, means for transmitting said motion to one vector, means for modifying said motion to represent direction of movement of said object with respect to a variable datum, means for transmitting the modified motion to the other vector, means for introducing corrections into the component elements of said one vector and thus resetting that vector with respect to the fixed datum, and means for superimposing that change upon the transmitting means to the other vector to correspondingly reset that vector.

4. In apparatus for controlling the firing of ordnance against targets, the combination of a mechanical vector, means for positioning the vector with respect to a datum representing the line of sight to a target, a second mechanical vector, means for positioning the second vector with respect to a datum representing a geographical coordinate, a pair of elements operable by the first vector for resolving it into components having predetermined relations to the datum of said vector, a pair of elements operable by the second vector for resolving it into components having predetermined relations to the datum of said second vector, means for applying correctional displacements to the second pair of elements to reposition the vector with which they are associated, and means under the control of the repositioned vector for correspondingly repositioning the first vector with respect to its datum.

5. In computing apparatus, the combination of a mechanical vector settable with respect to a datum representing a quantity having a variable geographical relation, a second mechanical vector settable with respect to a datum representing a quantity having a fixed geographical relation, a pair of elements operable by one of the vectors for resolving it into components having predetermined relations with respect to the datum of said vector, a second pair of elements operable by the other vector for resolving it into components having predetermined relations with respect to the datum of said other vector, means for applying correctional displacements to the elements of the second named pair of elements to reposition the vector with which they are associated, and means under the control of the repositioned vector for correspondingly repositioning the first named vector with respect to its datum.

6. In computing apparatus, the combination of a pair of mechanical vectors, manually operable means for positioning one of said vectors with respect to a predetermined datum and the other of said vectors with respect to a predetermined datum differing from the first datum, a pair of elements operable by one of said vectors for resolving it into components having predetermined relations with respect to the datum of said vector, a second pair of elements operable by the other vector for resolving it into components having predetermined relations with respect to the datum of said other vector, means for applying correctional displacements to the elements of one of the pairs of elements to reposition the vector with which they are associated, and means under the control of the repositioned vector for automatically repositioning the other vector with respect to its datum.

7. In computing apparatus, the combination of a pair of mechanical vectors, means for positioning one of the vectors with respect to a predetermined datum and the other vector with respect to a predetermined datum differing from the first datum, a pair of component elements operated by each vector for resolving each vector into components having predetermined relations to its datum, mechanism for reversibly operating one of the pairs of elements to independently reposition the vector with which these elements are associated, and means under the control of the repositioned vector for repositioning the other vector and the pair of component elements related thereto.

8. In a computing apparatus for use in gun fire control, the combination of a mechanical vector representative of the course and speed of a target referred to a predetermined datum, a second mechanical vector representative of the course and speed of a target referred to a different predetermined datum, component elements operatively related to each vector, common means for introducing estimated values of the course and speed of a target and thereby positioning both vectors accordingly and relative to their respective data, means for applying correctional displacements to the component elements related to one of the vectors according to observed values of factors of the movement of the target and thereby repositioning that vector, and means under the control of the repositioned vector for correspondingly repositioning the other vector and the component elements related thereto.

9. In a computing apparatus, the combination of a mechanical vector representing characteristics of the movement of an object, means operable by the vector for resolving it into components bearing a predetermined relation to a datum line, a second mechanical vector representing the same characteristics of the movement of an object, means operable by the second vector for resolving it into components bearing a predetermined relation to a different datum line, means for correctionally displacing the second resolving means to alter the second vector, and means under the control of the second vector for correspondingly altering the first vector.

10. In a computing apparatus, the combination of a mechanical vector representing the estimated course and speed of a moving object referred to a predetermined datum, means operatively related to the vector for generating values of a quantity representing one of the factors determining the relative position of the object, a comparing device for comparing the generated values of the quantity and its observed values, a second mechanical vector representing the estimated course and speed of the object referred to a different datum, means associated with the comparing device for altering the second vector in accordance with differences between the generated and observed values of the quantity, and means operable by the second vector for correspondingly altering the first vector to affect the generating means operable thereby.

11. In a computing apparatus, the combination of a device having a part settable in accordance with estimated values of target speed and target angle and elements operable by said part for resolving these values into components bearing a predetermined relation to the line of sight to the target, mechanism operable in part by the elements for generating values of quantities representing the position of the target, means for comparing the generated values of the quantities with observed values thereof, a second device having a part settable in accordance with estimated values of target speed and target true course and elements operable by the second named part for resolving these values into components bearing a predetermined relation to a geographical coordinate, means associated with the comparing means for displacing the elements of the second device in accordance with differences between the generated and observed values of the quantities to alter the position of the part of the second device, and means under the control of the part of the second device for correspondingly altering the position of the part of the first device and the elements operable thereby to cause correctional adjustments in the generating mechanism operable by these elements.

12. In a computing apparatus, the combination of a component solver including an element settable in accordance with estimated values of target speed and target angle and a slide operable by the element, mechanism operable in part by the slide for generating values of a quantity representing one of the factors determining the relative position of the target, means for comparing the generated values of the factors with observed values thereof, a vector solver including an element settable in accordance with estimated values of target speed and target true course and a slide, means associated with the comparing means for displacing the last named slide in accordance with differences between the generated and the observed values of the quantity to alter the position of the element of the vector solver, means under the control of the element of the vector solver for correspondingly altering the position of the element of the component solver and the slide operable thereby to cause correctional adjustments in the generating mechanism.

13. In a computing apparatus, the combination of a pair of mechanical vectors settable in accordance with the estimated course and speed of a target, means operable in part by one of the vectors for continuously generating values of the range of the target, an element operable periodically in accordance with observed values of range, a coacting element operable continuously in accordance with the generated values of range, a device adapted to be operated in part in accordance with differences between the observed and generated values of range as indicated by the elements for applying corresponding correctional displacements to the second vector, mechanism including an input part adapted to be operated in accordance with said differences, an input part movable with respect to the first part proportional to the time interval between the range observations and an output part operable by the second part for modifying the generated values of range during said intervals between observed values of range, and means under the control of the second vector for correspondingly altering the first vector to modify the range generating means operable thereby.

14. In a computing apparatus, the combination of a pair of mechanical vectors settable in accordance with the estimated course and speed of a target, means operable in part by one of the vectors for continuously generating values of the range of the target, an element operable periodically in accordance with observed values of range, a coacting element operable continuously in accordance with the generated values of range, a device adapted to be operated in part in accordance with differences between the observed and generated values of range as indicated by the elements for applying corresponding correctional displacements to the second vector, means under the control of the second vector for correspondingly altering the first vector to modify the values of the range generated by the range generating means at the times when the observed values of range may be obtained, mechanism operable in accordance with said differences between the observed and generated values of range and the elapsed time between observations for modifying the range generated during said intervals between observations.

15. In a computing apparatus, the combination of a pair of mechanical vectors representing characteristics of the movement of an object, means for positioning the vectors, means operatively connected to one of the vectors for continually generating values of a quantity representing one of the factors determining the relative position of the object, an element actuated periodically in accordance with observed values of the quantity, a coacting element actuated continuously in accordance with the generated values of the quantity, correctional mechanism including a controlling part adapted to be actuated in accordance with differences between the observed and the generated values of the quantity as indicated by the elements, means operable by the mechanism for applying correctional displacements to the second vector, means under the control of the second vector for correspondingly altering the first vector to modify the generated values of the quantity at times when the values of the quantity may be obtained by observation, a device having an element under the control of the controlling part of the mechanism, and an element operable in accordance with the time which has elapsed since the preceding observation and means controlled by said elements for modifying the generated values of the quantity during the intervals between the receipt of observed values of the quantity.

16. In a computing apparatus, the combination of a pair of mechanical vectors settable in accordance with estimated values of the characteristics of the movement of an object, means operatively connected to one of said vectors for generating values of a quantity representing one of the factors determining the relative position of the object, an element actuated in accordance with observed values of the quantity, a coacting element actuated in accordance with the generated values of the quantity, correctional mechanism including a part adapted to be actuated in accordance with differences between the generated and the observed values of the quantity as indicated by the elements, other parts operable in accordance with values of other quantities representing the position of the object and a device operable by all of said parts for determining the required corrections to said estimated values, means operable by the device for applying correctional displacements to the second vector, and means under the control of the second vector for correspondingly altering the first vector to modify the generated values of the quantity.

17. In a computing apparatus, the combination of a pair of mechanical vectors settable in accordance with estimated values of the characteristics of the movement of an object, a pair of members associated with each vector for resolving it into components having a predetermined relation to each other, means operable in part by one of the members associated with one of the vectors for generating values of a quantity representing one of the factors determining the relative position of the object, an element actuated in accordance with observed values of the quantity, a coacting element operable in accordance with the generated values of the quantity, correctional mechanism including a part adapted to be actuated in accordance with differences between the generated and the observed values of the quantity as indicated by the elements, other parts operable in accordance with values of other quantities representing the position of the object and a device operable by all of said parts for determining the required corrections to said estimated values, means operable by the device for causing correctional displacements of the component members associated with the other vector to reposition it, and means under the control of said vector for repositioning the first vector to alter the member associated therewith to modify the generated values of the quantity.

18. In a computing apparatus, means for determining a rate correction comprising means for comparing observed and generated quantities, a correctional mechanism for introducing corrections into the generated quantity, actuating mechanism for the correctional mechanism, and a ratio device coupling the two mechanisms and automatically adjustable to maintain proportionality to elapsed time between corrections.

19. In a computing apparatus, means for determining a rate correction comprising means for comparing observed and generated quantities, means operable through a variable speed device for introducing corrections into the generated quantity, and time controlled mechanism for varying the ratio between the input and output speeds of the variable speed device.

20. In a computing apparatus, means for determining a rate correction comprising means for comparing observed and generated quantities, means operable through a variable speed device for introducing corrections into the generated quantity, time controlled mechanism for increasing the ratio between the input and output speeds of the variable speed device in proportion to the elapsed time between corrections, and resetting means for the time controlled mechanism operated by the time controlled mechanism during the operation of increasing the said ratio to store the resetting energy in the resetting means.

21. In a computing apparatus, automatic means for determining the rate of the component of movement of an aerial target along the line of sight, an integrator for integrating said rate into increments of range, transmitting means between the automatic means and the integrator, manually controlled means for generating movement proportional to the speed of the target along the line of sight, and means for introducing the said movement into the transmitting means.

22. In a computing apparatus, means operable in accordance with the actual range and angle of elevation of an aerial target, means for separately generating the range and elevation angle of the target, each having rate of generation determining means, that for the elevation generating means including means evaluating the rate of climb of the target, corrective means actuated in accordance with the elevation of the target and errors in the range and elevation rates corresponding to differences between the actual and generated ranges and elevation angles of the target to determine the required rate of climb correction, and means for correctively adjusting said rate of climb evaluating means in accordance with the determined rate of climb correction.

23. In a computing apparatus, means operable in accordance with the actual range and angle of elevation of an aerial target, means for generating the range and angle of elevation of the target, the means for generating the latter quantity including the target's rate of climb evaluating means, corrective devices each including an element mounted for universal revolubility, means for positioning the axes of rotation of said revoluble elements according to the actual angle of elevation of the target, means driving said revoluble elements respectively according to the difference between the actual and generated ranges and the difference between the actual and generated angles of elevation, members responsive to said revoluble elements according to different trigonometric quantities, means for combining these quantities and determining a rate of climb correction, and means for adjusting said rate of climb evaluating means by said rate of climb correction means.

24. Computing apparatus, comprising a pair of settable mechanical vectors, means operatively related with each to represent the components of the respective vector, means to operate reversably the component means of one vector to change the setting of said one vector and means associating said two vectors whereby changing the setting of said one vector also changes the setting of said other vector and its component means.

No references cited.